United States Patent [19]
Brief et al.

[11] Patent Number: 5,459,731
[45] Date of Patent: Oct. 17, 1995

[54] LINK ERROR MONITORING

[75] Inventors: David C. Brief, Palo Alto, Calif.;
James F. Torgerson, Andover; James R. Hamstra, Shorewood, both of Minn.

[73] Assignee: National Semiconductor Corporation, Santa Clara, Calif.

[21] Appl. No.: 83,591

[22] Filed: Jun. 24, 1993

[51] Int. Cl.$^6$ .................................................. G06F 11/00
[52] U.S. Cl. .................. 371/5.1; 364/550; 364/265.1; 364/266.2; 364/DIG. 1
[58] Field of Search ............................ 364/550; 371/5.1; 395/200, 250

[56] References Cited

U.S. PATENT DOCUMENTS

| | | | |
|---|---|---|---|
| 3,036,290 | 5/1962 | Zarouni | 371/5.1 X |
| 3,390,379 | 6/1968 | Carlson et al. | 395/275 |
| 3,409,878 | 11/1968 | Lindinger et al. | 395/325 |
| 3,413,612 | 11/1968 | Brooks et al. | 395/325 |
| 5,023,872 | 6/1991 | Annamalai | 371/5.1 |
| 5,179,664 | 1/1993 | Li et al. | 395/250 |
| 5,185,863 | 2/1993 | Hamstra et al. | 395/250 |
| 5,299,201 | 3/1994 | Carusone, Jr. et al. | 371/5.1 |
| 5,331,642 | 7/1994 | Valley et al. | 371/5.1 X |

OTHER PUBLICATIONS

National Semiconductor's *Fiber Distributed Data Interface Designer's Guide*, No. 103751, 1990 Edition, Santa Clara, Calif.

National Semiconductor's *Desktop FDDI Handbook*, No. 550137, 1992 Edition, Santa Clara, Calif.

*FDDI Physical Layer Protocol (PHY-2)*, Draft Proposed American National Standard (ANSI), Rev. 5, Jun. 17, 1992.

*FDDI Hybrid Ring Control (HRC)*, Draft Proposed American National Standard (ANSI), Rev. 6.2, Publ. May 28, 1992.

*Primary Examiner*—Edward R. Cosimano
*Attorney, Agent, or Firm*—Skjerven, Morrill, MacPherson, Franklin & Friel

[57] ABSTRACT

In a communication network, an efficient link error monitor is provided that completely relieves the microprocessor of computing the link error rate and comparing it with link error rate thresholds. The link error rate computation and the comparison are performed by the physical layer of a communication station. The physical layer generates an interrupt to the microprocessor only if a threshold is crossed and a microprocessor action may be required. The physical layer includes a number of registers that can be conveniently written by the microprocessor to designate the thresholds and monitor the link errors. The link error rate is estimated using a simple estimator that provides a realistic link error rate estimate even at early stages of operation when few link errors have been detected and when, therefore, little statistical information on the link error rate exists.

37 Claims, 5 Drawing Sheets

LEMER

| D7 | D6 | D5 | D4 | D3 | D2 | D1 | D0 |
|---|---|---|---|---|---|---|---|
| LEMAE | LEMCE | LEMPE | LEMDE | LEMTE | res | res | res |

FIG. 3

LERC ← PASEXP

CLEIR ← log$_2$ LERC arm_pass ← 0     ; Pass event is unarmed arm_cutoff ← 1     ; Cutoff and Alarm arm_alarm ← 1     ;    events are armed

FIG. 4 if error not detected,
> increment LERC if error detected,
> shift LERC right (divide by 2)

CLEIR ← $\log_2$ LERC

FIG. 5A
(PRIOR ART)

if arm_alarm = 1 and
> CLEIR < LEALR then
> > LEMAE ← 1
> > arm_pass ← 1
> > arm_cutoff ← 1
> > arm_alarm ← 0 if arm_cutoff = 1 and
> CLEIR < LECUTR then
> > LEMCE ← 1
> > arm_pass ← 1
> > arm_cutoff ← 0
> > arm_alarm ← 0 if arm_pass = 1 and
> CLEIR ≥ LEPASR then
> > LEMPE ← 1
> > arm_pass ← 0
> > arm_cutoff ← 1
> > arm_alarm ← 1

FIG. 5B

LINK ERROR MONITORING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application is related to, and incorporates by reference, the following U.S. patent applications filed on the same date as the present application: the application Ser. No. 08/082,678 entitled "Method and Apparatus for Trace Propagation in a Ring Network" filed by David C. Brief, Robert L. Macomber and James R. Hamstra, pending; the application Ser. No. 08/082,193 entitled "Elasticity Buffer Control Method" filed by James R. Hamstra and David C. Brief, pending; the application Ser. No. 08/083,111 entitled "Hybrid Loopback for FDDI-II Slave Stations" filed by David C. Brief, pending; and the application Ser. No. 08/083,963 entitled "Intelligent Repeater Functionality" filed by David C. Brief, Gregory DeJager, James R. Hamstra, pending.

BACKGROUND OF THE INVENTION

The present invention relates to communication networks, and more particularly to monitoring the link errors in communication networks.

A communication network includes a number of stations connected by communication links. The errors on a link are monitored so as to take a corrective action when needed. For example, in some Fiber Distributed Data Interface (FDDI) networks, a link is taken out of the network when the link error rate exceeds a predetermined threshold.

In particular, in some FDDI networks, link errors are detected by the physical layer of a station that receives data on the link. When a link error is detected, the physical layer generates an interrupt to a microprocessor controlling the SMT (Station Management) layer. The interrupts allow the microprocessor to keep track of the link errors. On each such interrupt, the microprocessor recomputes the link error rate and compares it to the threshold. If the link error rate exceeds the threshold, the microprocessor reconfigures the network to take the link out.

In high speed transmission networks, a station receives many bits per second (125 Mbits/second in the FDDI network). Hence, if even a small proportion of the received bits is erroneous, computing the link error rate and comparing it to a threshold may take a significant amount of the microprocessor time. The microprocessor becomes detracted from other tasks such as controlling the station MAC layer (MAC stands for Media Access Control) and other layers. It is therefore desirable to make link error monitoring more efficient so as to place less burden on the microprocessor.

SUMMARY OF THE INVENTION

The present invention provides in some embodiments an efficient link error monitor apparatus and methods that completely relieve the microprocessor from computing the link error rate and comparing it to a threshold. The link error rate computation and the comparison are performed by the physical layer. The physical layer generates an interrupt to the microprocessor only if a threshold is crossed and a microprocessor action may be required.

The physical layer includes a number of registers that can be conveniently written by the microprocessor to initialize the link error monitoring operation.

The physical layer computes the link error rate using a simply algorithm requiring only one register. On reset, this register is initialized to a positive number based on a link error rate prediction. Thus the register provides a realistic link error rate estimate even before any link errors are detected.

This initial estimate is also used in recomputing the link error rate when link errors are detected, but the initial estimate is given progressively smaller weight as more link errors are detected. The initial estimate thus helps obtain a realistic link error rate estimate when only few link errors have been detected.

Other features and advantages of the invention are described below. The invention is defined by the appended claims.

DESCRIPTION OF THE PREFERRED EMBODIMENTS

Figure 1:
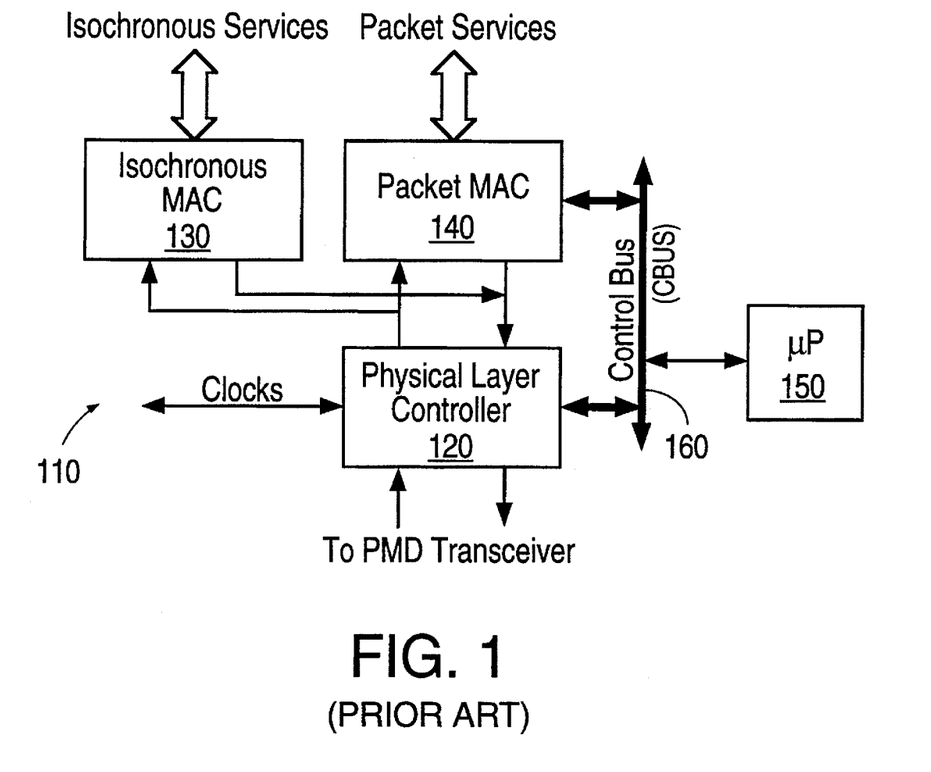
FIG. 1 is a partial block diagram of a communication station illustrating the use of the present invention.

FIG. 1 is a block diagram of a portion of communication station 110 such as, for example, an FDDI communication station. Physical layer controller 120 transmits data to and receives data from a PMD (physical media dependent) transceiver. The transceiver, not shown, is connected to a transmission medium such as a fiber optics cable. Physical layer controller 120 performs the FDDI form 5 bit/4 bit data encoding and decoding, serial/parallel data conversion, clock recovery, clock generation, and link error monitoring.

Controller 120 is connected to isochronous MAC (Media Access Control) 130 and packet MAC 140. MACs 130 and 140 control access to the communication medium and perform address recognition, address generation, and verification of frame check sequences. The two MACs are connected to a higher level data layer (not shown). Software-operated microprocessor 150 controls the two MACs and the physical layer controller 120. See *FDDI Physical Layer Protocol (PHY-2)* American National Standard (ANSI X3.231-199X) incorporated herein by reference. See also *Fiber Distributed Data Interface Designer's Guide* (National Semiconductor Corporation of Sunnyvale, Calif., 1990) incorporated herein by reference.

Microprocessor 150 communicates with MACs 130, 140 and controller 120 through control bus (CBUS) 160.

Controller 120 detects link errors on the link on which the controller receivers data through the PMD transceiver. If the link error rate exceeds a predetermined "cutoff" threshold, the FDDI network is reconfigured to take the link out of the network. If the link error rate decreases and falls below a "pass" threshold, the link is re-inserted into the network. (Of note, when the link is taken out of an FDDI network, a continuous idle pattern is transmitted on the link which allows controller 120 to continue measuring the error rate on the link.)

In order to relieve the microprocessor from computing the link error rate and comparing it with the thresholds, controller 120 performs these tasks itself. Controller 120 interrupts the microprocessor only when the link error rate crosses one of the threshold under certain conditions that may require microprocessor intervention. These conditions are described below. The microprocessor and CBUS overhead are therefore reduced.

Figure 2:
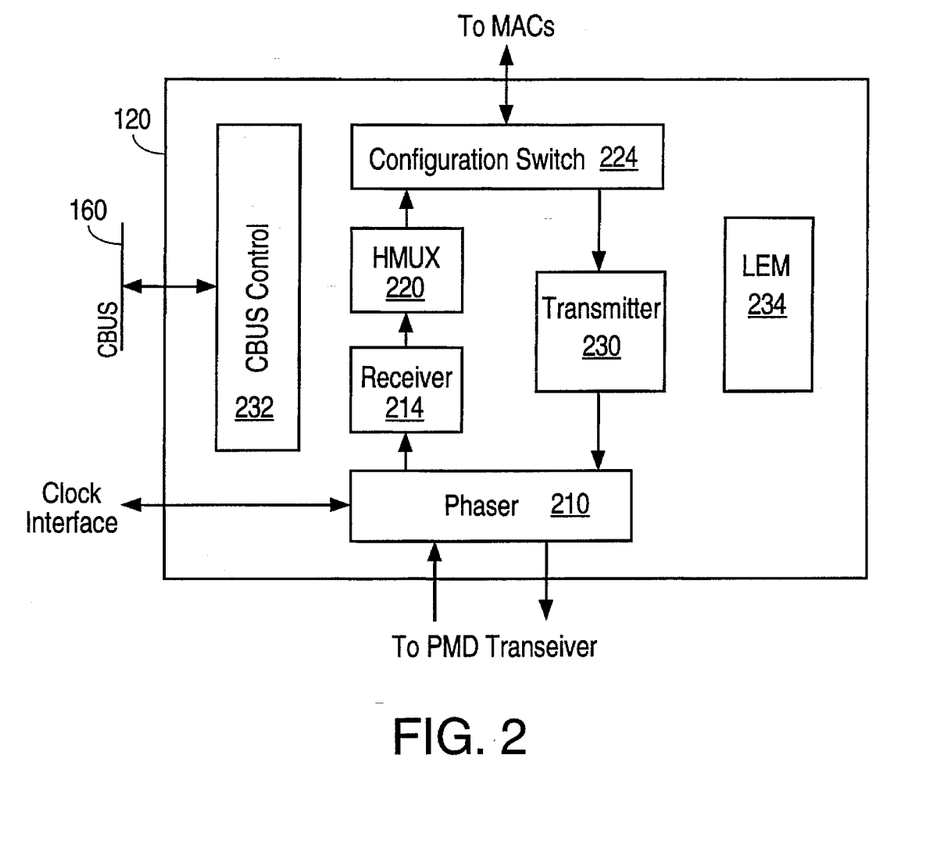
FIG. 2 is a partial block diagram of a physical layer controller according to the present invention.

FIG. 2 is a partial block diagram of one embodiment of controller 120. Such a controller is described, for example, in DP83258/9 PLAYER-2S™ *Enhanced Physical Layer Controller* (National Semiconductor Corporation, 1992) incorporated herein by reference. In controller 120, phaser 210 recovers the 125 megahertz clock from the incoming data stream from the PMD transceiver. Phaser 210 generates a 12.5 MHz clock for synchronizing the controller operation.

Receiver 214 performs serial-to-parallel conversion of the incoming data and detects link errors. The receiver performs also other operations as described in the aforementioned document *DP83258/9 PLAYER-2S™ Enhanced Physical Layer Controller.*

Hybrid Multiplexer (HMUX) 220 performs the functions of an HMUX slave device as defined in the Hybrid Ring Control American National Standard (ANSI X3.186-199X) incorporated herein by reference.

Configuration switch 224 allows switching the transmitted and received data paths between one or more physical layer controllers and MACs.

Transmitter 230 performs serial-to-parallel data conversion and other operations described in the aforementioned document *DP83258/9 PLAYER-2S™ Enhanced Physical Layer Controller.*

Link error monitor (LEM) 234 includes threshold registers for representing link error rate thresholds. The use of such thresholds is described for example, in the FDDI station management American National Standard (ANSI X3.229-199X) incorporated herein by reference. LEM 234 also includes circuitry for continuously monitoring the link error rate and comparing it with the thresholds. The comparison is performed on every cycle of the 12.5 MHz clock. An interrupt to microprocessor 150 is generated whenever a threshold is crossed under certain conditions described below.

The threshold registers are writable by microprocessor 150 through CBUS 160 and CBUS control 232. CBUS 160 includes address and data buses thus providing a simple interface to LEM 234.

The link error rate (LER) is defined as the ratio of the number of error bits to the total number of bits received. Under the ANSI FDDI PMD standard, the maximum tolerable LER is $2.5 \times 10^{-10}$. Thus in some applications, the pass threshold is $2.5 \times 10^{-10}$ or lower.

As is known, at the transmission speed of 125 Mbits/second, $$LER = \frac{N}{T \times 125 \times 10^6} \quad (1)$$

where N is the number of link error bits in a time interval of T seconds. If T is the interval between successive error bits, then N=1.

LEM 234 estimates LER by computing T as a weighted average time interval AveInt between link errors. The highest weight is given to the most recent time interval between errors. More particularly, if $i_0, i_1 \ldots i_n$ are successive time intervals between errors, then $$AveInt = \frac{1}{2} i_n + \frac{1}{4} i_{n-1} + \frac{1}{8} i_{n-2} + \frac{1}{16} i_{n-3} + \ldots \frac{1}{2^{n+2}} i_0 \quad (2)$$

Of note, the infinite sum of all the weights is equal to 1, i.e.,:

$$\sum_{i=1}^{\infty} 2^{-i} = 1$$

Controller 120 computers AveInt and the intervals $I_0, \ldots i_n$ in cycles of the 12.5 MHz clock, that is, in the units of 80 ns. Using these units, we obtain from formula (1):

$$LER = \frac{1}{AveInt \times 10} \quad (3)$$

In some embodiments, controller 120 does not detect all errors, and thus the actual LER can be higher than computer by controller 120. For example, in some FDDI embodiments, controller 120 detects only the following errors. In the ALS or CLS line states, a violation symbol is detected in the upper or lower nibble. In the ILS state, an error is detected if a symbol in either nibble is not Q, H or I and if successive nibbles do not form JK (the starting delimiter).

Controller 120 computers AveInt in an internal 48-bit register LERC. The logic equations for the controller 120 LEM circuitry are shown in Appendix A attached hereto. The equations are written in a language RTL easily understandable to persons skilled in the art. In RTL, assignments denoted by the symbol "=" are asynchronous assignments performed during the current clock cycle, and assignments denoted by "←" are synchronous assignments performed on the next rising edge of the clock. The clock is the 12.5 MHz clock generated by phaser 210.

LEM 234 includes register CLEIR holding the binary exponent of the number in register LERC. That is, $$LERC = 2^{CLEIR}$$

Register CLEIR is designated as "lei_bexp" in Appendix A. Register CLEIR is an 8-bit register. Its two most significant bits are unused. Register CLEIR is accessible from CBUS 160 which includes an 8-bit data bus.

LEM 234 computes the value of register CLEIR by determining the most significant "1" bit in register LERC. The mantissa of register LERC is discarded.

The following Table 1 shows the LEM registers accessible from the CBUS. Each register is an 8-bit register. CBUS 160 includes an address bus for addressing the registers. Register LERC is not accessible from CBUS 160 in some embodiments.

TABLE 1

| Register | Description |
|---|---|
| CLEIR | Binary exponent of the interval between errors. The interval is stored in LERC. |
| LECUTR | Binary exponent of the cutoff threshold time interval between errors. |
| LEPASR | Binary exponent of the pass threshold time interval between errors. |
| LEALR | Binary exponent of the alarm threshold time interval between errors. |

TABLE 1-continued

| Register | Description |
|---|---|
| LEMER | LEM event register. |
| LEMMR | LEM mask register. |

Registers LECUTR, LEPASR, LEALR represent, respectively, the cutoff, pass, and alarm thresholds, The alarm threshold in a typical application is set between the cutoff and pass thresholds. When the alarm threshold is exceeded under certain conditions described below, an interrupt is generated to microprocessor 150 to alarm the user of a high error rate.

Each register LECUTR, LEPASR, LEALR is written with a binary exponent of the time-between-errors interval corresponding to the respective threshold. If LER_THRESH is a link error rate threshold, equation (3) above provides:

$$\text{time-between-errors} = \frac{1}{LER\_THRESH \times 10},$$

$$\text{Binary exponent} = \frac{-\log_{10} LER\_THRESH - 1}{\log_2 10}$$

$$= \frac{-\log_{10} LER\_THRESH - 1}{0.301}$$

In some embodiments, when controller 120 is reset, registers LECUTR, LEPASR, LEALR are initialized, respectively, to the binary exponents of times-between-errors corresponding to the LER_THRESH values $10^{-7}$, $2.5 \times 10^{-10}$, $10^{-9}$.

The LER cutoff threshold is exceeded when the value in register CLEIR is below the value in register LECUTR. When the cutoff threshold is exceeded, controller 120 sets an internal flag LEM_cutoff, signaling a Cutoff event. When register CLEIR has a value less than the value of register LEALR, controller 120 sets an internal flag LEM_alarm, signaling an Alarm event. When the value of register CLEIR is equal to or greater than the value of register LEPASR, controller 120 sets an internal flag LEM_pass, signaling a Pass event.

To avoid multiple interrupts when the link error rate is hovering around a threshold, the thresholds are "armed" so as to provide a hysteresis as follows. When the Cutoff event occurs, the pass threshold is armed and the alarm and cutoff thresholds are unarmed. Thus after the LER cutoff threshold is exceeded, cutoff and alarm threshold crossing does not generate an interrupt until the pass threshold is reached. When the Pass event occurs, the pass threshold is unarmed and the cutoff and alarm thresholds are armed so that respected occurrences of the Pass event will not generate an interrupt until the Cutoff or Alarm event occurs. When the Alarm event occurs, the pass and cutoff thresholds are armed and the alarm threshold is unarmed.

Figure 3:
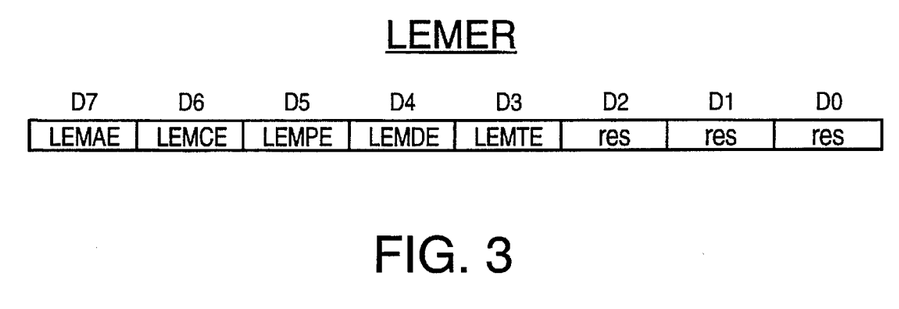
FIG. 3 illustrates a Link Event Monitor Event Register of the controller of FIG. 2.

An armed event (i.e., crossing of an armed threshold) caused a bit to be set in LEM event register LEMER illustrated in FIG. 3. The bits of register LEMER are described in the following Table 2.

TABLE 2

| Bit | Symbol | Description |
|---|---|---|
| D7 | LEMAE | LEM ALARM EVENT: This bit is set when an armed Alarm event occurs. |
| D6 | LEMCE | LEM CUTOFF EVENT: This bit is set when an armed Cutoff event occurs. |
| D5 | LEMPE | LEM PASS EVENT: This bit is set when an armed Pass event occurs. |
| D4 | LEMDE | LEM DETECT EVENT: This bit is set when a Link Error Event is detected. A Link Error Event is an occurrence of a predetermined number of errors as defined by an LEM register writable by the microprocessor. See, for example, the description of the device PLAYER+ ™ in Desktop FDDI Handbook (National Semiconductor Corporation of Sunnyvale, California, 1992) incorporated herein by reference. This bit may be used in implementations that want to time-stamp link errors and use an alternate LER algorithm. |
| D3 | LEMTE | LEM THRESHOLD EVENT: This bit is set when the specified threshold number of events is reached. This bit may be used in implementations that use an alternate LER algorithm. |
| D2:0 | res | Reserved for future use. |

When any one of bits LEMAE, LEMCE, LEMPE is set, controller 120 generates an interrupt to microprocessor 150 (unless the interrupt is masked as described below). Microprocessor 150 can then read register LEMER to determiner which event has occurred. The microprocessor can then write register LEMER to reset the register. When a bit of register LEMER becomes set, microprocessor 150 is prevented by controller 120 from writing the register LEMER until the microprocessor reads the register. This prevents the microprocessor from overwriting the register LEMER before detecting that a register bit has been set.

LEM mask register LEMMR has one bit for each bit of register LEMER to mask the corresponding interrupt. For example, if bit D7 of mask register LEMMR is reset, an interrupt is not generated when bit D7 of register LEMER is set.

Bits D2:0 of register LEMMR are reserved for future use just as bits D2:0 of register LEMER.

Figure 4:
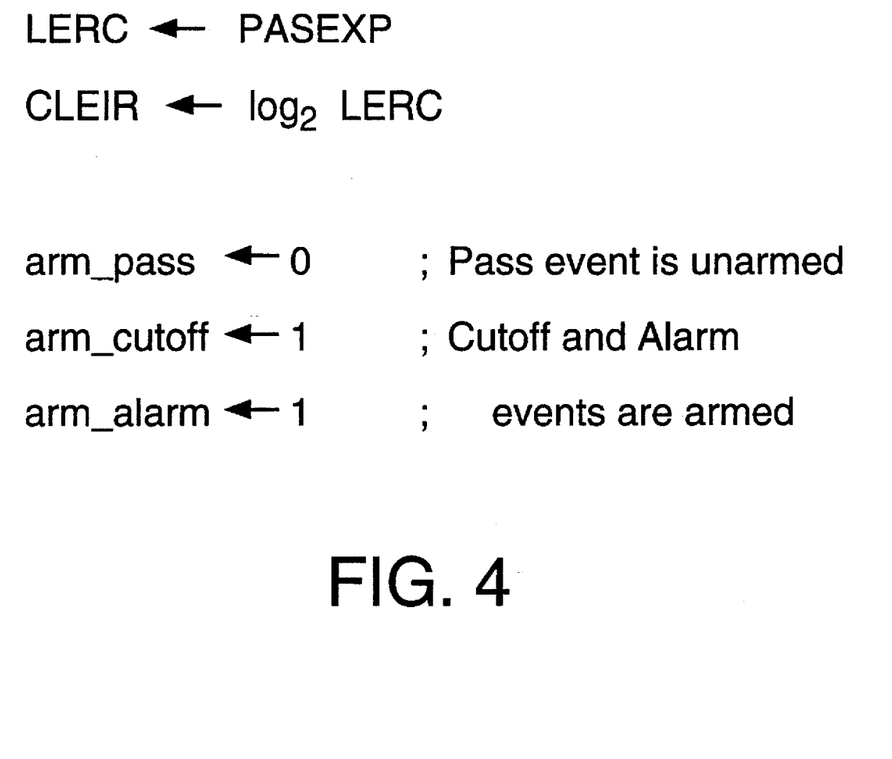
FIGS. 4, 5a and 5b are pseudo-code representations of portions of the logic circuitry of the controller of FIG. 2.

FIG. 4 illustrates in pseudo-code some logic operations performed by LEM 234 on reset. Register LERC is initialized to the value of the 48-bit register PASEXP. Register PASEXP holds the pass threshold time interval between errors, that is, $$PASEXP = 2^{LEPASR} \qquad (4)$$

Register LERC is initialized to PASEXP rather than to zero for the following reasons. The initial value of LERC corresponds to the time interval $i_0$ of formula (2). Interval $i_0$ is given the weight of $\frac{1}{2}^{n+1}$ where n+1 is the number of detected link errors. Thus when the number of detected errors is small, the interval $i_0$ is given a large weight. If register LERC were initialized to zero, register LERC would not provide as accurate estimate of the link error rate until a large number of errors were received, except for systems where the link error rate is very large, that is, where the average time interval between link errors is close to zero. Since in most networks the average time interval is closer to the pass threshold time interval than to zero, initializing the register LERC to the pass threshold time interval allows obtaining a realistic estimate of the actual link error rate immediately upon reset or at least after detecting but a small number of link errors.

In some embodiments register LERC is initialized on reset to another positive value. This value is greater in some embodiments then the cutoff threshold time interval between errors. In some embodiments, this value is greater than the alarm threshold time interval between errors.

As shown in FIG. 4, register CLEIR receives the binary exponent of the value in register LERC.

Flag arm__pass is reset (receives the value zero) so that the Pass event is unarmed. Flags arm__cutoff and arm__alarm are set so that the Cutoff and Alarm events are armed.

Figure 5A:
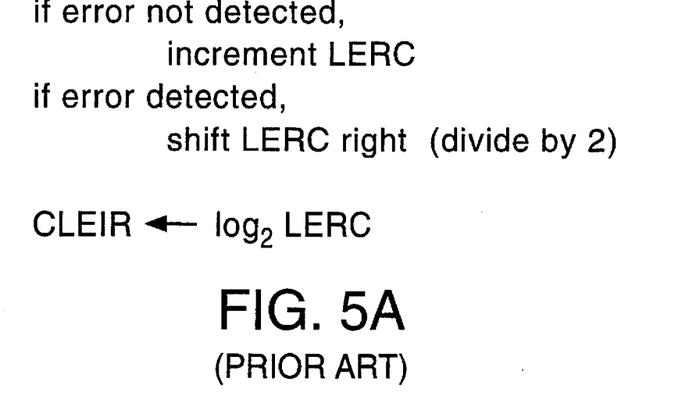
Figure 5B:
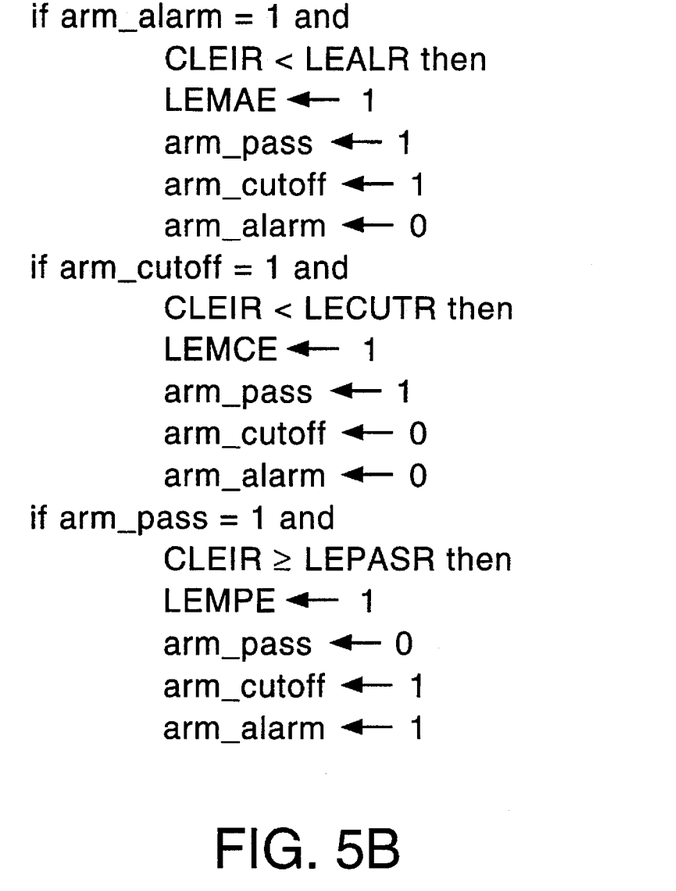

FIGS. 5a, 5b show in pseudo-code some logic operations performed by LEM 234 after reset on every rising edge of the 12.5 MHz clock. If a new link error has not been detected, register LERC is incremented, and if a new link error has been detected, the contents of register LERC are shifted right to divide the register by two. The reason for these operations is as follows. If the value AveInt after the receipt of n+1 errors is denoted $AveInt_n$, then formula (2) above shows that:

$$AveInt_n = \frac{1}{2}(i_n + AveInt_{n-1}) \tag{5}$$

When a new link error is not detected, register LERC is incremented so that register LERC during an error-free interval $i_n$ becomes increased by $i_n$. When a new error is detected, register LERC is divided by two to obtain $AveInt_n$.

As shown in FIG. 5a, register CLEIR receives the binary exponent of register LERC.

Register CLEIR is compared with the three thresholds to determine whether a bit should be set in LEM event register LEMER. If the Alarm event is armed (arm_alarm=1) and the value of register CLEIR is smaller than the value of register LEALR, then (1) the LEMAE bit of the LEM event register is set indicating the Alarm event; (2) the Pass and Cutoff events are armed (flags arm__pass and arm__cutoff are set); and (3) the Alarm event is unarmed (flag arm__alarm is reset). If the Cutoff event is armed and CLEIR is less than LECUTR, then the LEMCE bit of register LEMER is set, the Pass event is armed and the Cutoff and Alarm events are unarmed. If the Pass event is armed and register CLEIR is greater than or equal to register LEPASR, then the LEMPE bit of register LEMER is set, the Pass event is unarmed and the Cutoff and Alarm events are armed. An interrupt is then generated in accordance with the values of registers LEMER and LEMMR.

As is seen from the above, LEM 234 determines whether the link error rate crosses a threshold, and if the interrupts are not masked, LEM 234 interrupts the microprocessor when: (1) the Pass event is armed and the link error rate LER crosses the pass threshold in the downward direction, that is, LER changes from a value larger than the pass threshold to a value equal to or below the pass threshold; (2) the Alarm event is armed and LER crosses the alarm threshold in the upward direction; or (3) the Cutoff event is armed and LER crosses the cutoff threshold in the upward direction.

While the invention has been illustrated with respect to the embodiments described above, other embodiments and variations are within the scope of the invention. In particular, the invention is not limited to register sizes or bus widths. Further, the invention is not limited to any particular clock rate or to any particular operations being performed on a particular edge or a particular cycle of a particular clock. In some embodiments, the Pass event is defined as the event that LER is less than the pass threshold rather than less than or equal to the pass threshold. In some embodiments, the Alarm event is defined as the event that LER is greater than or equal to the alarm threshold. In some embodiments, the Cutoff event is defined as the event that LER is greater than or equal to the cutoff threshold. Other embodiments and variations are within the scope of the invention as defined by the following claims.

APPENDIX A

; LEM RTL Module

```
; Inputs
        ; PC_LER_RST
        ; LEMRST
        ; LE_DETECT
        ; LS_OFF
        ; MRST
        ; CBA[7:0]
        ; CBD[7:0]
        ; CBC[7:0]
        ; CBRD
        ; CBWR
;Outputs
        ; PC_LER_FAIL
        ; ICR_LEME
        ; ICR_LEMT
        ; LEM_COND_ACC
        ; LEM_WR_REJECT
        ; LEM_WR_FAIL .CLOCK CHIP_LBC
1: ; Reset Conditions
        lem_reset = MRST | LS_OFF | LEMRST | PC_LER_RST
1: ; LEM Register Address Decodes
        ; LEMER - LEM Event Register
                lemer_en =  ( CBA[7:0] = 0B0),
        ; LEMMR - LEM Mask Register
                lemmr_en =  ( CBA[7:0] = 0B1),
        ; LETR - Link Error Threshold Register
                pl_letr_en =  ( CBA[7:0] = 95),
                letr_en =  ( CBA[7:0] = 0B2) | pl_letr_en,
        ;CLECR - Current Link Error Count Register
                pl_clecr_en =  ( CBA[7:0] = 96),
                clecr_en =  ( CBA[7:0] = 0B3) | pl_clecr_en,
        ;LEIR - Link Error Interval Register
                leir_en =  ( CBA[7:0] = 0B4),
        ;LEALR - LEM Alarm Threshold Register
                lealr_en =  ( CBA[7:0] = 0B5),
        ;LECUTR - LEM Cutoff Threshold Register
                lecutr_en =  ( CBA[7:0] = 0B6),
        ;LEPASR - LEM Pass Threshold Register
                lepasr_en =  ( CBA[7:0] = 0B7),
        lem_reg_en =
                CBA[7:3] = 16,      ;CBA = B0 to B7
        pl_reg_en =
                pl_letr_en |
                pl_clecr_en,
        lem_access =  lem_reg_en | pl_reg_en,
        LEM_COND_ACC = lemer_en,
        if ( ~(CBRD & lem_access ))  ; only drive bus on lem access & read
```

```
                    CBD[5] = 0z,
                    CBD[4] = 0z,
                    CBD[3] = 0z,
                    CBD[2] = 0z,
                    CBD[1] = 0z,
                    CBD[0] = 0z)
; Link Error Rate Estimator
    ;****************************************************************
            ; the Estimator computes a weighted average for the time between error events
            ; with a bias towards the most recent events
            ; the absolute value of the base 10 log of the Link Error Rate is then
            ;    greater than or equal to .3010 * lei_bexp +1
            ;    see the derivation in the functional spec
            ;****************************************************************
    1:
    increment = -lem_reset & -LE_DETECT & -(carry[5:0] = 3F),
    shift = -lem_reset & LE_DETECT,
    carry[5] = (lerc5[7:0] = 0FF),
    carry[4] = (lerc4[7:0] = 0FF),
    carry[3] = (lerc3[7:0] = 0FF),
    carry[2] = (lerc2[7:0] = 0FF),
    carry[1] = (lerc1[7:0] = 0FF),
    carry[0] = (lerc0[7:0] = 0FF)
    lem_reset:  ; Reset lerc to the Pass Threshold
            lerc0[7:0] <- pasexp0[7:0],   ; lerc[7:0]
            lerc1[7:0] <- pasexp1[7:0],   ; lerc[15:8]
            lerc2[7:0] <- pasexp2[7:0],   ; lerc[23:16]
            lerc3[7:0] <- pasexp3[7:0],   ; lerc[31:24]
            lerc4[7:0] <- pasexp4[7:0],   ; lerc[39:32]
            lerc5[7:0] <- pasexp5[7:0]    ; lerc[47:40]
    increment:
            lerc0[7:0] <- lerc0[7:0] + 1,
            if ( carry[0] ) then lerc1[7:0] <- lerc1[7:0] + 1,
            if ( (carry[1:0] = 3) ) then lerc2[7:0] <- lerc2[7:0] + 1,
            if ( (carry[2:0] = 7) ) then lerc3[7:0] <- lerc3[7:0] + 1,
            if ( (carry[3:0] = 0F) ) then lerc4[7:0] <- lerc4[7:0] + 1,
            if ( (carry[4:0] = 1F) ) then lerc5[7:0] <- lerc5[7:0] + 1
    shift:      ; shift right  - divide by 2
            lerc5[7] <- 0,    ; lerc[47] <- 0
            lerc5[6:0] <- lerc5[7:1] ,  ; lerc[46:0] <- lerc[47:1],
            lerc4[7] <- lerc5[0],
            lerc4[6:0] <- lerc4[7:1] ,
            lerc3[7] <- lerc4[0],
            lerc3[6:0] <- lerc3[7:1] ,
            lerc2[7] <- lerc3[0],
            lerc2[6:0] <- lerc2[7:1] ,
            lerc1[7] <- lerc2[0],
            lerc1[6:0] <- lerc1[7:1] ,
            lerc0[7] <- lerc1[0],
            lerc0[6:0] <- lerc0[7:1]
    1:   ; determine binary exponent (look at number of leading 0s)
            if ( lerc5[7] ) then   lei_bexp[5:0] <- 2F ,
            else if ( lerc5[6] ) then   lei_bexp[5:0] <- 2E ,
            else if ( lerc5[5] ) then   lei_bexp[5:0] <- 2D,
            else if ( lerc5[4] ) then   lei_bexp[5:0] <- 2C,
            else if ( lerc5[3] ) then   lei_bexp[5:0] <- 2B,
            else if ( lerc5[2] ) then   lei_bexp[5:0] <- 2A,
            else if ( lerc5[1] ) then   lei_bexp[5:0] <- 29,
            else if ( lerc5[0] ) then   lei_bexp[5:0] <- 28 ,
            else if ( lerc4[7] ) then   lei_bexp[5:0] <- 27 ,
            else if ( lerc4[6] ) then   lei_bexp[5:0] <- 26 ,
            else if ( lerc4[5] ) then   lei_bexp[5:0] <- 25,
            else if ( lerc4[4] ) then   lei_bexp[5:0] <- 24,
            else if ( lerc4[3] ) then   lei_bexp[5:0] <- 23,
            else if ( lerc4[2] ) then   lei_bexp[5:0] <- 22,
            else if ( lerc4[1] ) then   lei_bexp[5:0] <- 21,
            else if ( lerc4[0] ) then   lei_bexp[5:0] <- 20 ,
            else if ( lerc3[7] ) then   lei_bexp[5:0] <- 1F ,
            else if ( lerc3[6] ) then   lei_bexp[5:0] <- 1E ,
            else if ( lerc3[5] ) then   lei_bexp[5:0] <- 1D,
            else if ( lerc3[4] ) then   lei_bexp[5:0] <- 1C,
            else if ( lerc3[3] ) then   lei_bexp[5:0] <- 1B,
            else if ( lerc3[2] ) then   lei_bexp[5:0] <- 1A,
            else if ( lerc3[1] ) then   lei_bexp[5:0] <- 19,
            else if ( lerc3[0] ) then   lei_bexp[5:0] <- 18 ,
            else if ( lerc2[7] ) then   lei_bexp[5:0] <- 17 ,
            else if ( lerc2[6] ) then   lei_bexp[5:0] <- 16 ,
            else if ( lerc2[5] ) then   lei_bexp[5:0] <- 15,
```

```
           else if ( lerc2[4] ) then   lei_bexp[5:0] <- 14,
           else if ( lerc2[3] ) then   lei_bexp[5:0] <- 13,
           else if ( lerc2[2] ) then   lei_bexp[5:0] <- 12,
           else if ( lerc2[1] ) then   lei_bexp[5:0] <- 11,
           else if ( lerc2[0] ) then   lei_bexp[5:0] <- 10,
           else if ( lerc1[7] ) then   lei_bexp[5:0] <- 0F ,
           else if ( lerc1[6] ) then   lei_bexp[5:0] <- 0E ,
           else if ( lerc1[5] ) then   lei_bexp[5:0] <- 0D,
           else if ( lerc1[4] ) then   lei_bexp[5:0] <- 0C,
           else if ( lerc1[3] ) then   lei_bexp[5:0] <- 0B,
           else if ( lerc1[2] ) then   lei_bexp[5:0] <- 0A,
           else if ( lerc1[1] ) then   lei_bexp[5:0] <- 09,
           else if ( lerc1[0] ) then   lei_bexp[5:0] <- 08,
           else if ( lerc0[7] ) then   lei_bexp[5:0] <- 07 ,
           else if ( lerc0[6] ) then   lei_bexp[5:0] <- 06 ,
           else if ( lerc0[5] ) then   lei_bexp[5:0] <- 05,
           else if ( lerc0[4] ) then   lei_bexp[5:0] <- 04,
           else if ( lerc0[3] ) then   lei_bexp[5:0] <- 03,
           else if ( lerc0[2] ) then   lei_bexp[5:0] <- 02,
           else if ( lerc0[1] ) then   lei_bexp[5:0] <- 01,
           else  lei_bexp[5:0] <- 00
; LEMER - LEM Event Register
;*******************************************************************
           ; the estimator effectively truncates the mantissa, this is reflected in
           ; the type of comparisons done,
           ; when comparing values for values less than the threshold we do
                ; less than comparisons. this includes the alarm and cutoff thresholds.
           ;when comparing values for thresholds greater than the threshold we do
                ; greater than or equal comparisons. this inlcudes the better and pass thresholds
           ; LEM_alarm  is true when current LE interval is less than the alarm threshold
           ; LEM_cutoff  true when current LE interval is less than the cutoff threshold
           ; LEM_pass  true when current LE interval is greater than or equal to the pass threshold
           ; remember that the LE interval is the average time between error events
           ;    Cutoff                             Alarm                          Pass
           ;      -<-- LEM_Cutoff                  -<--- LEM_Alarm
           ;                                                                  -->- LEM_Pass ;
           ;    low LER interval                                             high LER interval
           ; some hysteresis is provided to make the events more meaningful
           ;  for example, after the pass threshold is reached, the pass threshold event
           ; will not be signalled again until the cutoff threshold is passed,
           ;*******************************************************************

MRST: lemer[7:0] <- CBD[7:0]  ; CBD is forced to zero during reset
lem_reset:
           ; these arm flops provide  the hysteresis between threshold events
           ; the leir is reset to the pass threshold on reset
           arm_pass <- 0,
           arm_cutoff <- 1,
           arm_alarm <- 1
-lem_reset:  ; Internal Writes and hysteresis logic
           if ( arm_alarm & LEM_alarm ) then (
                   set_lemer_7 = 1,
                   lemer[7] <-1,
                   arm_pass <- 1,
                    arm_cutoff <- 1,
                   arm_alarm <- 0 ),
           if ( arm_cutoff & LEM_cutoff ) then (
                   set_lemer_6 = 1,
                   lemer[6] <-1,
                   arm_pass <- 1,
                   arm_cutoff <- 0,
                   arm_alarm <- 0 ),
           if ( arm_pass & LEM_pass ) then (
                   set_lemer_5 = 1,
                   lemer[5] <-1,
                   arm_pass <- 0,
                   arm_cutoff <- 1,
                   arm_alarm <- 1 ),
           if ( LE_DETECT ) then (
                   set_lemer_4 = 1,
                   lemer[4] <-1),
           if (Link_Error_Thresh_reached ) then  (
                   set_lemer_3 = 1,
                   lemer[3] <-1 ),
           ICR_LEMT = (clecr[7:0] = 0) | Link_Error_Thresh_reached  ; Signal for player ICR register
lemer_en & CBWR:
           lemerc[7] =  -(CBC[7] ! lemer[7]),
           lemerc[6] =  -(CBC[6] ! lemer[6]),
```

```
            lemerc[5] = ~(CBC[5] ! lemer[5]),
            lemerc[4] = ~(CBC[4] ! lemer[4]),
            lemerc[3] = ~(CBC[3] ! lemer[3]),
            lemerc[2] = ~(CBC[2] ! lemer[2]),
            lemerc[1] = ~(CBC[1] ! lemer[1]),
            lemerc[0] = ~(CBC[0] ! lemer[0]),
            if (lemerc[7] & ~set_lemer_7 ) then lemer[7] <- CBD[7],
            if (lemerc[6] & ~set_lemer_6 ) then lemer[6] <- CBD[6],
            if (lemerc[5] & ~set_lemer_5 ) then lemer[5] <- CBD[5],
            if (lemerc[4] & ~set_lemer_4 ) then lemer[4] <- CBD[4],
            if (lemerc[3] & ~set_lemer_3 ) then lemer[3] <- CBD[3],
            if (lemerc[2] ) then lemer[2] <- CBD[2],
            if (lemerc[1] ) then lemer[1] <- CBD[1],
            if (lemerc[0] ) then lemer[0] <- CBD[0],
            LEM_WR_FAIL = ~( lemerc[7:0] = OFF)
    lemer_en & CBRD:
            CBD[7:3] = lemer[7:3],
            CBD[2:0] = 0
; LEMMR - LEM Mask Register
    MRST:
            lemmr[7:0] <- CBD[7:0]   ; CBD is forced to zero during reset
    lemmr_en & CBWR:
            lemmr[7:0] <- CBD[7:0]
    lemmr_en & CBRD:
            CBD[7:3] = lemmr[7:3],
            CBD[2:0] = 0
    1: ICR_LEME =
            lemer[0] & lemmr[0] |
            lemer[1] & lemmr[1] |
            lemer[2] & lemmr[2] |
            lemer[3] & lemmr[3] |
            lemer[4] & lemmr[4] |
            lemer[5] & lemmr[5] |
            lemer[6] & lemmr[6] |
            lemer[7] & lemmr[7]
; LETR - Link Error Threshold Register
    MRST:
            letr[7:0] <- CBD[7:0] ; CBD is forced to zero during reset
    letr_en & CBWR:
            letr[7:0] <- CBD[7:0],
            clecr[7:0] <- CBD[7:0]
    letr_en & CBRD:
            CBD[7:0] = letr[7:0]
; CLECR  - Current Link Error Count Register
    MRST:
            clecr[7:0] <- CBD[7:0] ; CBD is forced to zero during reset
    ;Internal Writes
            1:
            if ( LE_DETECT) then
                    if (clecr[7:1] = 0) ; the count is one or zero and an error occurs
                            then ( clecr <- letr,
                                   Link_Error_Thresh_reached = 1),
                            else clecr <- clecr - 1
    clecr_en & CBRD:
            CBD[7:0] = clecr[7:0]
    clecr_en & CBWR:
            LEM_WR_REJECT =1
; LEIR - Link Error Interval Register
    leir_en & CBWR:
            LEM_WR_REJECT = 1
    leir_en & CBRD:
            CBD[5:0] = lei_bexp [5:0],
            CBD[7:6] = 0
; LEALR - LEM Alarm Threshold Register
    MRST:
            lealr[5:0] <- CBD[5:0] ; CBD is forced to zero during reset
    lealr_en & CBWR:
            lealr[5:0] <- CBD[5:0]
    lealr_en & CBRD:
            CBD[5:0] = lealr[5:0],
            CBD[7:6] = 0
    1: ;Alarm  compared with  ler
            ALor[5] = ~(lealr[5] ! lei_bexp[5]),
            ALor[4] = ~(lealr[4] ! lei_bexp[4]),
            ALor[3] = ~(lealr[3] ! lei_bexp[3]),
            ALor[2] = ~(lealr[2] ! lei_bexp[2]),
            ALor[1] = ~(lealr[1] ! lei_bexp[1]),
            ALor[0] = ~(lealr[0] ! lei_bexp[0]),
```

```
            lealr_gt_leir =
                    lealr[5] & -lei_bexp[5] |
                    ALor[5] & lealr[4] & -lei_bexp[4] |
                    ALor[5] & ALor[4] & lealr[3] & -lei_bexp[3] |
                    ALor[5] & ALor[4] & ALor[3] & lealr[2] & -lei_bexp[2] |
                    ALor[5] & ALor[4] & ALor[3] & ALor[2] & lealr[1] & -lei_bexp[1] |
                    ALor[5] & ALor[4] & ALor[3] & ALor[2] & ALor[1] & lealr[0] & -lei_bexp[0],
    LEM_alarm = lealr_gt_leir
            ; LEM_alarm is true when current LER interval is less than the alarm threshold
; LECUTR - LEM Cutoff Threshold Register
    MRST:
            lecutr[5:0] <- CBD[5:0] ; CBD is forced to Zero during reset
    lecutr_en & CBWR:
            lecutr[5:0] <- CBD[5:0]
    lecutr_en & CBRD:
            CBD[5:0] = lecutr[5:0],
            CBD[7:6] = 0
    1: ;Cutoff compared with ler
            CUor[5] = -(lecutr[5] | lei_bexp[5]),
            CUor[4] = -(lecutr[4] | lei_bexp[4]),
            CUor[3] = -(lecutr[3] | lei_bexp[3]),
            CUor[2] = -(lecutr[2] | lei_bexp[2]),
            CUor[1] = -(lecutr[1] | lei_bexp[1]),
            CUor[0] = -(lecutr[0] | lei_bexp[0]),
            lecutr_gt_leir =
                    lecutr[5] & -lei_bexp[5] |
                    CUor[5] & lecutr[4] & -lei_bexp[4] |
                    CUor[5] & CUor[4] & lecutr[3] & -lei_bexp[3] |
                    CUor[5] & CUor[4] & CUor[3] & lecutr[2] & -lei_bexp[2] |
                    CUor[5] & CUor[4] & CUor[3] & CUor[2] & lecutr[1] & -lei_bexp[1] |
                    CUor[5] & CUor[4] & CUor[3] & CUor[2] & CUor[1] & lecutr[0] & -lei_bexp[0],
    PC_LER_FAIL = lecutr_gt_leir,
    LEM_cutoff = lecutr_gt_leir
            ; LEM_cutoff true when current LER interval is less than the cutoff threshold
; LEPASR - LEM Pass Threshold Register
    MRST:
            lepasr[5:0] <- CBD[5:0] ; CBD is forced to Zero during reset
    lepasr_en & CBWR:
            lepasr[5:0] <- CBD[5:0]
    lepasr_en & CBRD:
            CBD[5:0] = lepasr[5:0],
            CBD[7:6] = 0
    1: ;Pass compared with ler
            PAor[5] = -(lepasr[5] | lei_bexp[5]),
            PAor[4] = -(lepasr[4] | lei_bexp[4]),
            PAor[3] = -(lepasr[3] | lei_bexp[3]),
            PAor[2] = -(lepasr[2] | lei_bexp[2]),
            PAor[1] = -(lepasr[1] | lei_bexp[1]),
            PAor[0] = -(lepasr[0] | lei_bexp[0]),
            lepasr_gt_leir =
                    lepasr[5] & -lei_bexp[5] |
                    PAor[5] & lepasr[4] & -lei_bexp[4] |
                    PAor[5] & PAor[4] & lepasr[3] & -lei_bexp[3] |
                    PAor[5] & PAor[4] & PAor[3] & lepasr[2] & -lei_bexp[2] |
                    PAor[5] & PAor[4] & PAor[3] & PAor[2] & lepasr[1] & -lei_bexp[1] |
                    PAor[5] & PAor[4] & PAor[3] & PAor[2] & PAor[1] & lepasr[0] & -lei_bexp[0],
    LEM_pass = -lepasr_gt_leir
            ; LEM_pass true when current LER interval is greater than or equal to the pass threshold
    1: ; Pass threshold binary expansion (used for LER estimate reset)
            ; pasexp0
                    pasexp0[0] = (lepasr[5:0] = 0),
                    pasexp0[1] = (lepasr[5:0] = 1),
                    pasexp0[2] = (lepasr[5:0] = 2),
                    pasexp0[3] = (lepasr[5:0] = 3),
                    pasexp0[4] = (lepasr[5:0] = 4),
                    pasexp0[5] = (lepasr[5:0] = 5),
                    pasexp0[6] = (lepasr[5:0] = 6),
                    pasexp0[7] = (lepasr[5:0] = 7),
            ; pasexp1
                    pasexp1[0] = (lepasr[5:0] = 8),
                    pasexp1[1] = (lepasr[5:0] = 9),
                    pasexp1[2] = (lepasr[5:0] = 0A),
                    pasexp1[3] = (lepasr[5:0] = 0B),
                    pasexp1[4] = (lepasr[5:0] = 0C),
                    pasexp1[5] = (lepasr[5:0] = 0D),
                    pasexp1[6] = (lepasr[5:0] = 0E),
                    pasexp1[7] = (lepasr[5:0] = 0F),
            ; pasexp2
```

```
            pasexp2[0] = (lepasr[5:0] = 10),
            pasexp2[1] = (lepasr[5:0] = 11),
            pasexp2[2] = (lepasr[5:0] = 12),
            pasexp2[3] = (lepasr[5:0] = 13),
            pasexp2[4] = (lepasr[5:0] = 14),
            pasexp2[5] = (lepasr[5:0] = 15),
            pasexp2[6] = (lepasr[5:0] = 16),
            pasexp2[7] = (lepasr[5:0] = 17),
; pasexp3
            pasexp3[0] = (lepasr[5:0] = 18),
            pasexp3[1] = (lepasr[5:0] = 19),
            pasexp3[2] = (lepasr[5:0] = 1A),
            pasexp3[3] = (lepasr[5:0] = 1B),
            pasexp3[4] = (lepasr[5:0] = 1C),
            pasexp3[5] = (lepasr[5:0] = 1D),
            pasexp3[6] = (lepasr[5:0] = 1E),
            pasexp3[7] = (lepasr[5:0] = 1F),
; pasexp4
            pasexp4[0] = (lepasr[5:0] = 20),
            pasexp4[1] = (lepasr[5:0] = 21),
            pasexp4[2] = (lepasr[5:0] = 22),
            pasexp4[3] = (lepasr[5:0] = 23),
            pasexp4[4] = (lepasr[5:0] = 24),
            pasexp4[5] = (lepasr[5:0] = 25),
            pasexp4[6] = (lepasr[5:0] = 26),
            pasexp4[7] = (lepasr[5:0] = 27),
; pasexp5
            pasexp5[0] = (lepasr[5:0] = 28),
            pasexp5[1] = (lepasr[5:0] = 29),
            pasexp5[2] = (lepasr[5:0] = 2A),
            pasexp5[3] = (lepasr[5:0] = 2B),
            pasexp5[4] = (lepasr[5:0] = 2C),
            pasexp5[5] = (lepasr[5:0] = 2D),
            pasexp5[6] = (lepasr[5:0] = 2E),
            pasexp5[7] = (lepasr[5:0] = 2F) | (lepasr[5:4] = 3)
```

What is claimed is:

1. In a communication network, a method for estimating an average time interval between link errors, said method comprising the steps of:
   on reset, initializing a register to a positive value R0 which exceeds a threshold time interval between errors;
   detecting link errors and updating the register so that, when the nth link error is detected where n=1, 2, ..., N and N is a positive integer greater than or equal to 1, the register has the value.

$$w_1 \times i_n + w_2 \times i_{n-1} + \ldots + w_n \times i_1 + w_{n+1} \times R0$$

where $i_1, i_2, \ldots, i_n$ are successive time intervals between errors and $w_1, \ldots, w_N$ are predetermined positive weights, the register value being an estimate of the average time interval between link errors.

2. The method of claim 1 wherein R0 exceeds a cutoff threshold time interval between errors.

3. The method of claim 1 wherein R0 exceeds an alarm threshold time interval between errors.

4. The method of claim 1 wherein R0 is a pass threshold time interval between errors.

5. The method of claim 1 wherein $$\sum_{i=1}^{\infty} w_i = 1.$$

6. The method of claim 1 wherein:
   $w_{n+1} = p \times w_n$ for a predetermined number p and for each $n \geq 1$; and
   said step of detecting link errors and updating the register comprises the steps of:
      determining a time unit in which the link error rate is to be computer in the register;
      each said time unit, performing the steps of:
         checking whether a new link error has been detected;
         if a new link error has not been detected, then incrementing the register;
         if a new link error has been detected, then multiplying the register by the predetermined number p.

7. The method of claim 1 wherein:
   $W_{n+1} = p \times w_n$ for a predetermined number p and for each $n \geq 1$; and
   said step of detecting link errors and updating the register comprises the steps of:
   updating the register so that, when the nth link error is detected, the register value is $i_n$ plus the value that the register had at the start of the interval $i_n$; and then
   multiplying the register by said predetermined number p.

8. The method of claim 7 where p=½.

9. The method of claim 1 further comprising generating an interrupt signal when the register value crosses a threshold in a predetermined direction.

10. The method of claim 9 wherein the threshold is one of a plurality of thresholds, and wherein said method comprises generating an interrupt signal whenever the register value crosses any one of said thresholds in a respective predetermined direction.

11. The method of claim 10 wherein for each threshold an interrupt signal is generated only if the threshold is unarmed.

12. The method of claim 10 wherein said threshold time interval is one of said thresholds.

13. A method for estimating an average time between link errors in a communication network, said method comprising the steps of:
   providing a circuitry for storing an estimated time interval between errors;
   initializing said estimated time interval stored in said circuitry to a positive number that is greater than a threshold time interval between errors;
   providing a clock signal;
   on each cycle of the clock signal:
      determining if a new link error has been detected;
      if a new link error has not been detected, then adding to said estimated time interval in said circuitry a predetermined number I representing a length of one cycle of the clock signal; and
      if a new link error has been detected, then dividing said estimated time interval in said circuitry by a predetermined number D to obtain an estimate for a weighted average time between link errors.

14. The method of claim 13 wherein said threshold time interval between errors is an alarm time interval between errors.

15. The method of claim 13 wherein said threshold time interval between errors is a cutoff time interval between errors.

16. The method of claim 13 wherein said positive number is a pass threshold time interval between errors.

17. The method of claim 13 wherein I=1.

18. The method of claim 13 wherein D=2.

19. The method of claim 13 further comprising generating an interrupt signal when the estimated time interval crosses a threshold in a predetermined direction.

20. In a physical layer controller for controlling a physical layer of a station capable of being inserted into a communication network, an apparatus for providing an average time interval between errors, the apparatus comprising:
   a register for providing the average time interval between errors;
   a circuitry C1 for initializing said register on reset to a positive number; and
   a circuitry C2 for adding to said register a length of a time interval in which a new link error has not been detected, and if a new link error has been detected, for dividing said register by a predetermined number D to obtain a weighted average time between link errors.

21. The apparatus of claim 20 further comprising a circuitry for supplying a clock signal for clocking the circuit C2.

22. A link error rate signaling apparatus in a physical layer controller for controlling a physical layer of a station that is capable of insertion into a communication network, the link error rate signaling apparatus comprising:
   a threshold register REG_TH1 that a user may write in order to designate a link error rate threshold,
   a register R1 for representing a current link error rate, and
   a circuitry C1 for signaling when the link error rate represented by the register R1 crosses in a predetermined direction the threshold designated by the threshold register REG_TH1.

23. The apparatus of claim 22 wherein the circuitry C1 can generate an interrupt signal when the link error rate represented by the register R1 crosses in a predetermined direction the threshold represented by the register REG_TH1.

24. The apparatus of claim 22 further comprising a threshold register REG_TH2 that a user may write in order to designate a link error rate threshold, wherein the circuitry C1 can signal when the link error rate represented by the register R1 crosses in a predetermined direction the threshold designated by the register REG_TH2.

25. The apparatus of claim 24 wherein the circuitry C1 arms the threshold represented by the register REG_TH1 after the threshold designated by the register REG_TH2 is crossed so as not to signal again crossing the threshold designated by the register REG_TH2 until the link error rate crosses the threshold designated by the register REG_TH1.

26. The apparatus of claim 24 wherein the circuitry C1 comprises:

an event register; and a circuitry for setting a bit in the event register to a predetermined value to signal that the threshold designated by the register REG_TH1 has been crossed in a predetermined direction, and for setting another bit in the event register to a predetermined value to signal that the threshold designated by the register REG_TH2 has been crossed in a predetermined direction.

27. A link error event signaling apparatus in a physical layer controller for controlling a physical layer of a station that is capable of insertion into a communication network, the link error event signaling apparatus comprising:

a threshold register REG_TH1 that a user may write in order to designate a link error rate threshold TH1; and a circuitry C1 for signaling a link error event E1 consisting in the current link error rate being in a predetermined relationship with the threshold TH1.

28. The apparatus of the claim 27 wherein said predetermined relationship consists in the link error rate being greater than or equal to the threshold TH1.

29. The apparatus of claim 27 wherein said predetermined relationship consists in the link error rate being greater than the threshold TH1.

30. The apparatus of claim 27 wherein said predetermined relationship consists in the link error rate being less than the threshold TH1.

31. The apparatus of claim 27 wherein said predetermined relationship consists in the link error rate being less than or equal to the threshold TH1.

32. The apparatus of claim 27 further comprising a threshold register REG_TH2 that a user may write in order to designate a link error rate threshold TH2, wherein the circuitry C1 comprises a circuitry for signaling a link error event E2 consisting in the link error rate being in a predetermined relationship with the threshold TH2, and for unarming the event E1 when the event E1 is signaled so that the event E1 is not signaled again until an occurrence of the event E2.

33. The apparatus of claim 32 further comprising a threshold register REG_TH3 that a user may write in order to designate a link error threshold TH3 greater than or equal to one of the thresholds TH1, TH2 and less than or equal to the other one of the thresholds TH1, TH2, wherein the circuitry C1 comprises a circuitry for signaling a link error event E3 consisting in the link error rate being in a predetermined relationship with the threshold TH3 and for unarming the event E3 and arming the events E1 and E2.

34. A method for detecting and signaling link error rate events in a communication network, said method comprising the steps of:

designating a link error rate threshold TH1 and a link error rate threshold TH2;

detecting occurrences of an event E1 that consists in the current link error rate being in a predetermined relationship with the threshold TH1;

detecting occurrences of an event E2 that consists in the current link error rate being in a predetermined relationship with the threshold TH2; and when the event E1 is detected and armed, signaling the event E1, unarming the event E1 and arming the event E2.

35. The method of claim 34 further comprising, when the event E2 is detected and armed, the steps of signaling the event E2, unarming the event E2 and arming the event E1.

36. The method of claim 34 further comprising the steps of:

designating a link error rate threshold TH3 between the thresholds TH1, TH2;

detecting occurrences of an event E3 that consists in the link error rate being in a predetermined relationship with the threshold TH3; and when the event E3 is detected and armed, signaling the event E3, unarming the event E3 and arming the events E1 and E2.

37. The method of claim 34 wherein:

TH1 is less than TH2;

the event E1 comprises an event that the link error rate is less than the threshold TH1; and the event E2 comprises an event that the link error rate is greater than the threshold TH2.

* * * * *

UNITED STATES PATENT AND TRADEMARK OFFICE
CERTIFICATE OF CORRECTION

PATENT NO. : 5,459,731
DATED : October 17, 1995
INVENTOR(S) : David C. Brief, James E. Torgerson, James R. Hamstra It is certified that error appears in the above-identified patent and that said Letters Patent is hereby corrected as shown below:

Col. 2, line 7
delete "simply" and insert --simple--.

Col. 3, line 26
after "the" and before "Hybrid" insert --FDDI--.

Col. 4, line 15
delete "computers" and insert --computes--.

Col. 4, line 23
delete "computer" and insert --computed--.

Col. 5, line 24
in the formula for Binary Exponent, delete "$\log^2_{z10}$" and insert --$\log_{10}2$--.

Col. 9 and 10
after last line (after "read") insert new lines
--then ( CBD[7] = 0z,
           CBD[6] = 0z,--

UNITED STATES PATENT AND TRADEMARK OFFICE
CERTIFICATE OF CORRECTION

PATENT NO. : 5,459,731
DATED : October 17, 1995
INVENTOR(S) : David C. Brief, et al It is certified that error appears in the above-indentified patent and that said Letters Patent is hereby corrected as shown below:

Col. 21, line 36
    delete "computer" and insert --computed--.

Signed and Sealed this

Thirtieth Day of April, 1996

Attest:

BRUCE LEHMAN

*Attesting Officer*      *Commissioner of Patents and Trademarks*